United States Patent
Marinelli et al.

(10) Patent No.: US 10,654,743 B2
(45) Date of Patent: May 19, 2020

(54) BURNER HEAD ACTUATOR FOR LUBRICATING GLASSWARE MOLDS OF A GLASSWARE FORMING MACHINE

(71) Applicant: Owens-Brockway Glass Container Inc., Perrysburg, OH (US)

(72) Inventors: Matthew G Marinelli, Sylvania, OH (US); Jeffrey W Cramer, Liberty Center, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 295 days.

(21) Appl. No.: 15/898,942

(22) Filed: Feb. 19, 2018

(65) Prior Publication Data
US 2019/0256401 A1    Aug. 22, 2019

(51) Int. Cl.
*C03B 40/027*    (2006.01)
*C03B 9/41*    (2006.01)

(52) U.S. Cl.
CPC .............. *C03B 40/027* (2013.01); *C03B 9/41* (2013.01); *C03B 2207/42* (2013.01); *C03B 2207/81* (2013.01)

(58) Field of Classification Search
CPC ............................. C03B 40/02; C03B 40/027
USPC ...................................... 65/26, 170
See application file for complete search history.

(56) References Cited

U.S. PATENT DOCUMENTS

| | | |
|---|---|---|
| 3,814,594 A | 6/1974 | Mumford |
| 4,494,973 A | 1/1985 | Perry |
| 4,568,371 A | 2/1986 | Nebelung et al. |
| 4,765,821 A | 8/1988 | Doud |
| 4,990,171 A | 2/1991 | Kojima et al. |
| 5,597,396 A | 1/1997 | Tohjo |
| 5,938,806 A | 8/1999 | Mine et al. |
| 7,063,498 B1 | 6/2006 | DiFrank et al. |
| 7,383,695 B2 | 6/2008 | Cramer |

(Continued)

FOREIGN PATENT DOCUMENTS

| | | |
|---|---|---|
| EP | 0203371 A1 | 12/1986 |
| EP | 0393630 A1 | 10/1990 |

(Continued)

OTHER PUBLICATIONS

English language abstract for EP 0393630 A2.

(Continued)

*Primary Examiner* — Cynthia Szewczyk

(57) ABSTRACT

A burner head actuator for lubricating glassware molds of a glassware forming machine includes a base mount and a guide post carried by the mount. A gearbox housing carried on the guide post carries a gear train including drive and driven gears. A servomotor is coupled to the gearbox. A burner head arm is carried by the gearbox housing and coupled to the driven gear for rotation relative to the gearbox housing about an arm axis. The arm includes a burner head leveling gear train including a drive sprocket direct-driven by the driven gear about the arm axis and a driven sprocket driven by the drive sprocket via a chain. The servomotor rotates the gearbox drive gear, thereby rotating the gearbox driven gear and burner head arm, and thereby rotating the leveling gear train so that the burner head remains level as the arm is rotated about the arm axis.

20 Claims, 9 Drawing Sheets

(56) References Cited

U.S. PATENT DOCUMENTS

| | | | |
|---|---|---|---|
| 2006/0144088 A1* | 7/2006 | Green | C03B 40/027 65/26 |
| 2006/0179881 A1* | 8/2006 | Cramer | C03B 40/027 65/26 |
| 2007/0026350 A1* | 2/2007 | Scott | C03B 40/027 431/132 |
| 2007/0277558 A1* | 12/2007 | Boatwright | F23Q 3/006 65/417 |
| 2009/0061100 A1 | 3/2009 | Donges et al. | |

FOREIGN PATENT DOCUMENTS

| | | | |
|---|---|---|---|
| GB | 2182297 A | 10/1985 | |
| JP | 05-294665 A | 11/1993 | |
| JP | 109-227135 A | 9/1997 | |
| JP | H09227135 A | 9/1997 | |

OTHER PUBLICATIONS

English language abstract for JP 05-294665 A.
English language abstract for JP 09-227135 A.
PCT Search Report and Written Opinion, Int. Serial No. PCT/US2019/015794, Int. Filing Date: Jan. 30, 2019, Applicant: Owens-Brockway Glass Container Inc., dated Apr. 15, 2019.

* cited by examiner

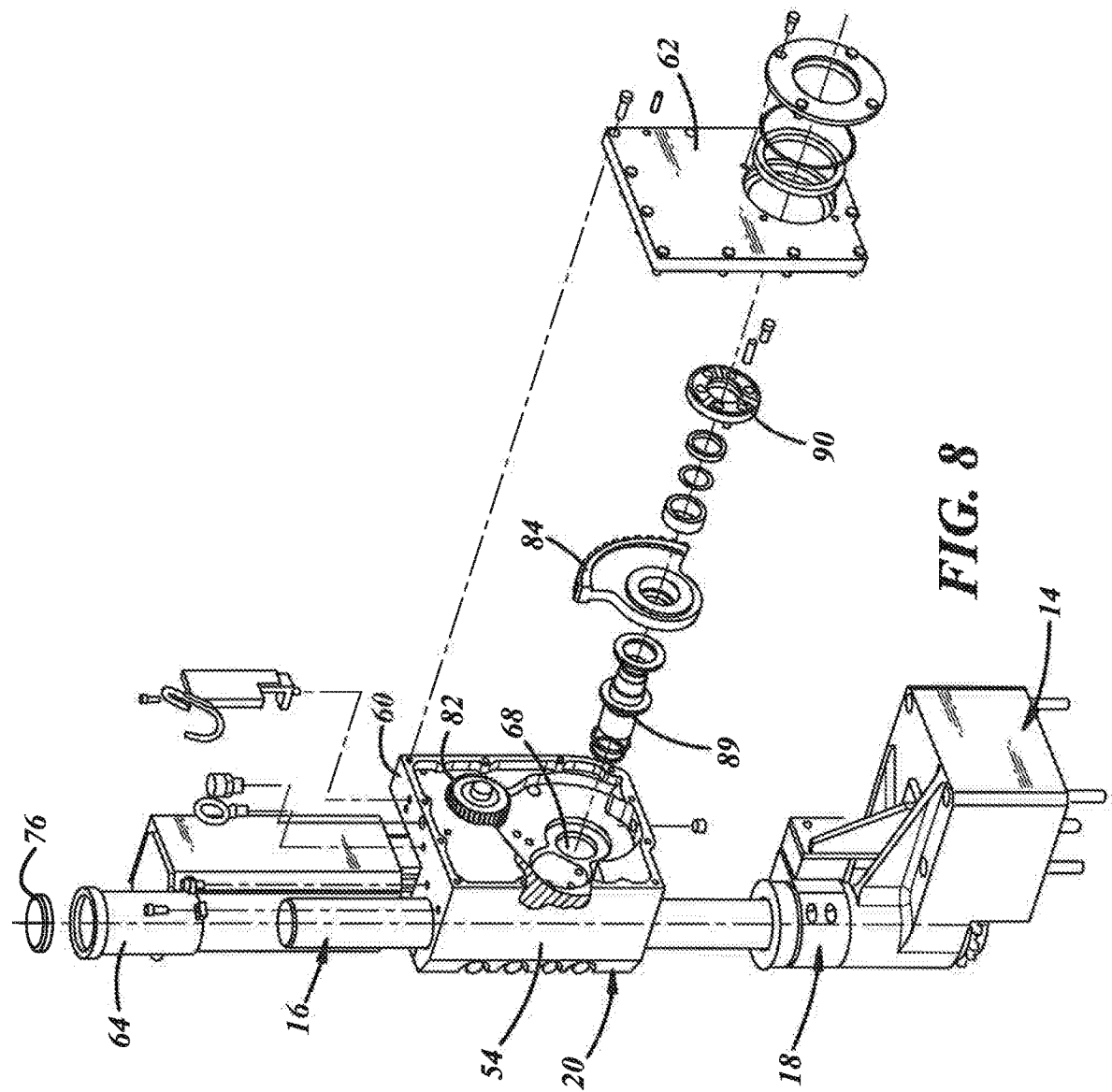

BURNER HEAD ACTUATOR FOR LUBRICATING GLASSWARE MOLDS OF A GLASSWARE FORMING MACHINE

BACKGROUND a. Field

This disclosure relates to burner heads used in lubricating glassware molds in glassware forming machines. In particular, the disclosure relates to an actuator for the burner head that facilitates movement of the burner head in a variety of directions while maintaining the burner head in a level position.

b. Background Art

A conventional I.S. (individual section) machine for forming articles of glassware includes a set of blank molds in which gobs of glass are formed into glass blanks. The glass blanks are then moved from the blank molds to blow molds where the glass blanks are formed to a final shape. The molds in the forming machine are typically lubricated by igniting a combustible gas to deposit carbon soot in the molds. The gas is ignited by a burner head that is periodically or cyclically moved by an actuator into and out of a lubricating position near the molds during the manufacturing process.

Conventional actuators for moving the burner heads rotate the burner head as it is moved towards and away from the lubricating position. As a result, any lingering flame from or a flame that is advertently reignited can be misdirected towards components within the forming machine. In addition, conventional actuators incorporate mechanisms to maneuver the burner head in various directions (e.g., to cycle the burner head into and out of the lubrication position and to vary the height of the burner head as different sizes of glassware are formed) that are relatively complex, relatively heavy and are difficult to manufacture and assemble/disassemble. Further, conventional actuators make it difficult to service the burner head and components of the actuator supporting the burner head because it is difficult to access the burner head and supporting components.

The inventors herein have recognized a need for a burner head actuator for lubricating glassware molds in a glassware forming machine that will minimize and/or eliminate one or more of the above-identified deficiencies.

BRIEF SUMMARY

This disclosure relates to burner heads used in lubricating glassware molds in glassware forming machines. In particular, the disclosure relates to an actuator for the burner head that facilitates movement of the burner head in a variety of directions while maintaining the burner head in a level position.

A burner head actuator for lubricating glassware molds of a glassware forming machine in accordance with one embodiment includes a base mount and a guide post carried by the base mount and having a longitudinally extending guide post axis. The actuator further includes a gearbox having a housing carried on the guide post and a gear train carried by the housing and including a drive gear and a driven gear. The actuator further includes a servomotor coupled to the gearbox. The actuator further includes a burner head arm carried by the gearbox housing and coupled to the driven gear for rotation relative to the gearbox housing about an arm axis. The arm includes a burner head leveling gear train including a drive sprocket direct-driven by the driven gear about the arm axis and a driven sprocket driven by the drive sprocket via a chain. The servomotor actuates the gearbox to rotate the gearbox drive gear, thereby rotating the gearbox driven gear and the burner head arm, and thereby rotating the leveling gear train so that the burner head remains level as the arm is rotated about the arm axis.

A burner head actuator for lubricating glassware molds of a glassware forming machine in accordance with another embodiment includes a base mount and a guide post carried by the base mount and having a gear rack and a longitudinally extending guide post axis. The actuator further includes a gearbox having a housing vertically adjustably carried on the guide post via a pinion gear rotatably carried by the housing and rotatable to move the gearbox housing up and down the guide post and a gear train carried by the housing and including a drive gear and a driven gear. The actuator further includes a servomotor coupled to the gearbox. The actuator further includes a burner head arm carried by the gearbox housing and coupled to the driven gear for rotation relative to the gearbox housing about an arm axis. The arm includes a burner head leveling gear train including a drive sprocket direct-driven by the driven gear about the arm axis and a driven sprocket driven by the drive sprocket via a chain. The servomotor actuates the gearbox to rotate the gearbox drive gear, thereby rotating the gearbox driven gear and the burner head arm, and thereby rotating the leveling gear train so that the burner head remains level as the arm is rotated about the arm axis.

A burner head actuator for lubricating glassware molds of a glassware forming machine in accordance with another embodiment includes a base mount and a guide post carried by the base mount and having a gear rack and a longitudinally extending guide post axis. The actuator further includes a gearbox having a housing vertically adjustably carried on the guide post via a pinion gear rotatably carried by the housing and rotatable to move the gearbox housing up and down the guide post and a gear train carried by the housing and including a drive gear and a driven gear. The actuator further includes a servomotor coupled to the gearbox. The actuator further includes a burner head arm carried by the gearbox housing and coupled to the driven gear for rotation relative to the gearbox housing about an arm axis. The arm includes a burner head leveling gear train including a drive sprocket direct-driven by the driven gear about the arm axis and a driven sprocket driven by the drive sprocket via a chain. The actuator further includes a post clamp disposed about the guide post and carrying a locking bolt wherein the locking bolt is fastenable to the base mount to prevent rotation of the guide post about the guide post axis and lock the gearbox, arm and burner head in an operating position about the guide post axis relative to the glassware forming machine, and is unfastenable to allow rotation of the guide post about the guide post axis and to allow the gearbox, the arm and the burner head to be rotated about the guide post axis to a maintenance position. The servomotor actuates the gearbox to rotate the gearbox drive gear, thereby rotating the gearbox driven gear and the burner head arm, and thereby rotating the leveling gear train so that the burner head remains level as the arm is rotated about the arm axis.

A burner head actuator in accordance the present teachings represents an improvement as compared to conventional actuators. The actuator maintains the burner head in a level position as it moves towards and away from the lubricating position. The disclosed actuator also enables movement of the burner head in various directions using mechanisms that are relatively simple, lightweight and easy to manufacture and assemble/disassemble. Further, the disclosed actuator enables easy access to the burner head and supporting components in order to service the burner head and supporting components.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIG. 8 is an exploded perspective view of a portion of the actuator of FIGS. 1-4.

DETAILED DESCRIPTION

Figure 1:
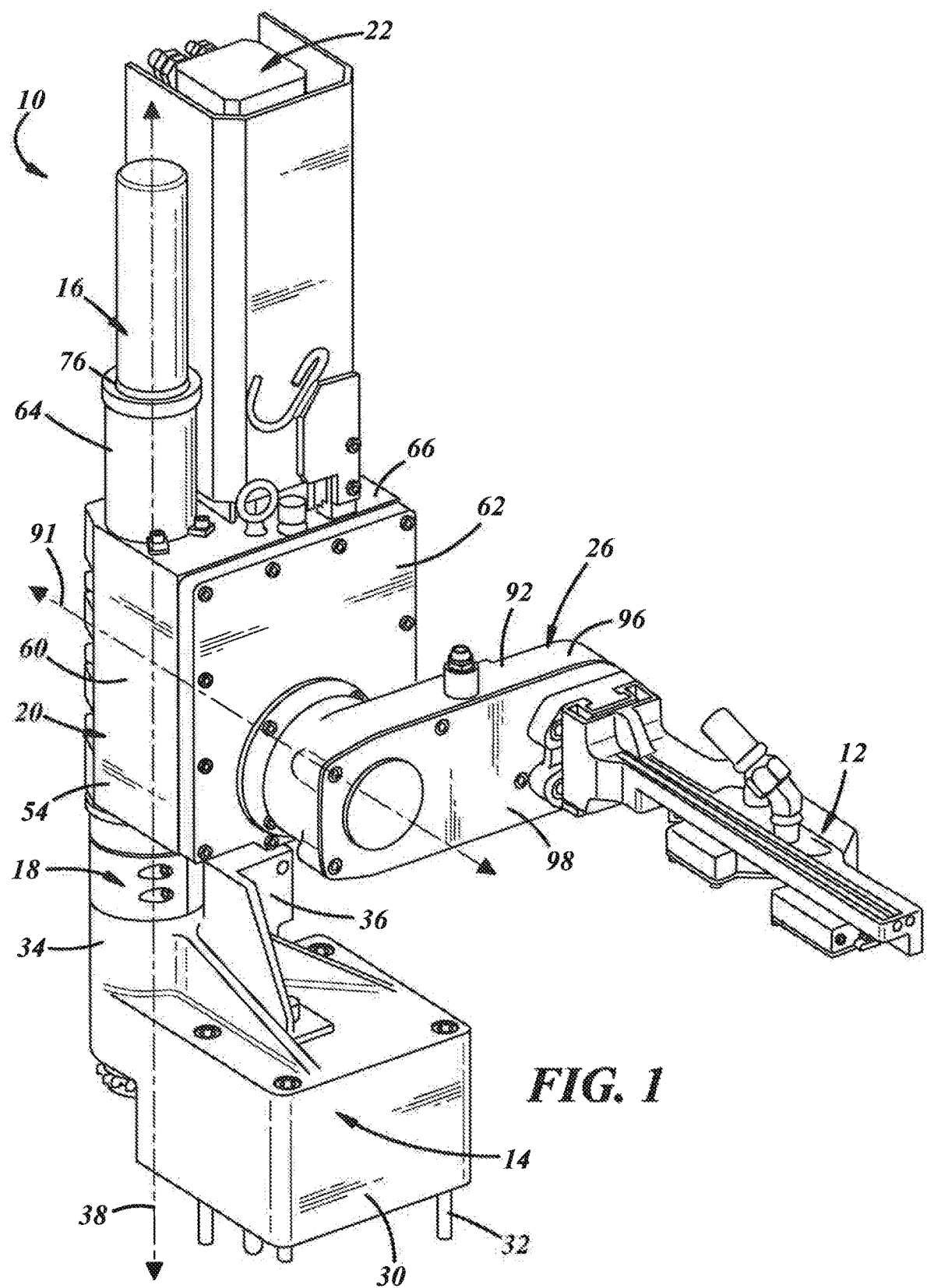
FIGS. 1-3 are perspective views of a burner head actuator for lubricating glassware molds of a glassware forming machine in accordance with one embodiment.
Figure 2:
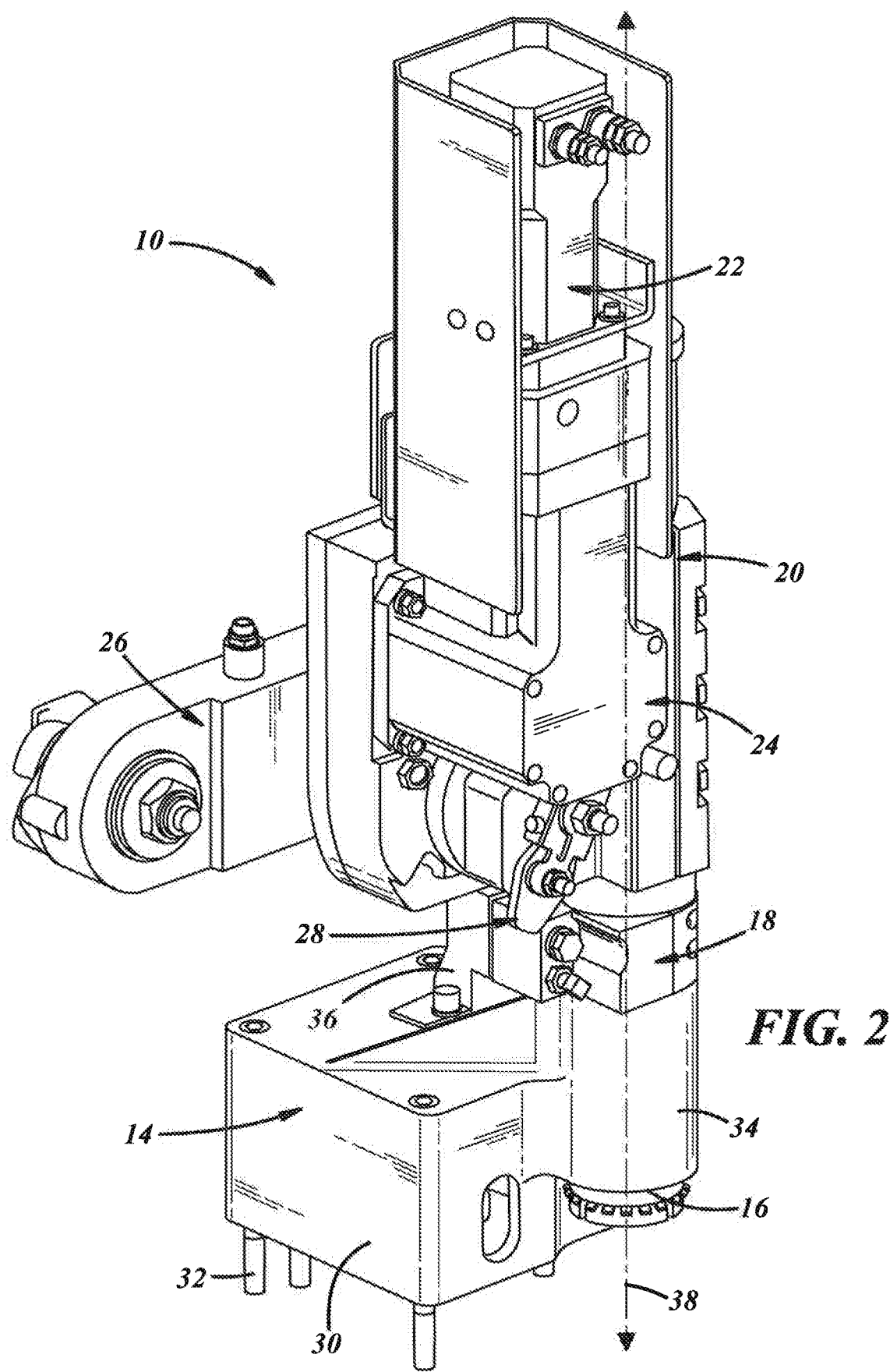

Referring now to the drawings wherein like reference numerals are used to identify identical components in the various views, FIGS. 1-4 illustrates a burner head actuator 10 for lubricating glassware molds of a glassware forming machine in accordance with one embodiment. Actuator 10 is configured to move a burner head 12 (FIG. 1) within and relative to the glass forming machine (not shown) which may comprise an I.S. (individual section) glass forming machine. The glass forming machine may include a plurality of blank molds, systems for forming glass blanks within the blank molds (through either a press or blow operation), blow molds, systems for transferring the glass blanks from the blank molds to the blow molds and systems for blowing the glass blanks into a final form. Burner head 12 periodically ignites a combustible gas mixture to deposit carbon soot in one or more molds in the machine in order to lubricate the molds. Burner head 12 may define one or more fluid inlets configured for coupling to gas supply lines, a fluid manifold that delivers the gases from the inlets to one or more discharge nozzles and a corresponding igniter such as a spark electrode for each nozzle. In the illustrated embodiment, the gas and electric supply lines leading to burner head 12 may be external to actuator 10 for easy access. Actuator 10 moves burner head 12 between a plurality of positions including a lubricating position in which burner head 12 deposits carbon soot into a mold, a non-lubricating position to which burner head 12 retreats between each operation and a maintenance position in which burner head 12 can be serviced. Actuator 10 may include a base mount 14, a guide post 16, a post clamp 18, a gearbox 20, a servo motor 22 and another gearbox 24, a burner head arm 26, and means, such as leveling arm 28, for adjusting a level of burner head 12 after assembly.

Base mount 14 couples actuator 10 to the glass forming machine or a nearby structure and positions actuator 10 relative to the glass forming machine. Base mount 14 further provides support for, and orients, the other components of actuator 10. Base mount 14 includes a body 30 that is in the shape of a rectangular prism in the illustrated embodiment having top and bottom walls and a side walls extend between the top and bottom walls. It should be understood, however, that the shape of body 30 may vary. Fasteners 32 may extend from the bottom wall of body 30 to couple base mount 14 to the glass forming machine or another structure. Base mount 14 further defines a tubular arm 34 extending vertically from one side wall of body 30 and configured to receive a portion of guide post 16 therein. Support baffles may extend from the top wall of body 30 to arm 34 and body 30 and arm 34 may form a unitary (one-piece) structure. Base mount 14 further includes a mounting bracket 36 that extends upward from and is coupled to the top wall of body 30 for a purpose described below.

Figure 5:
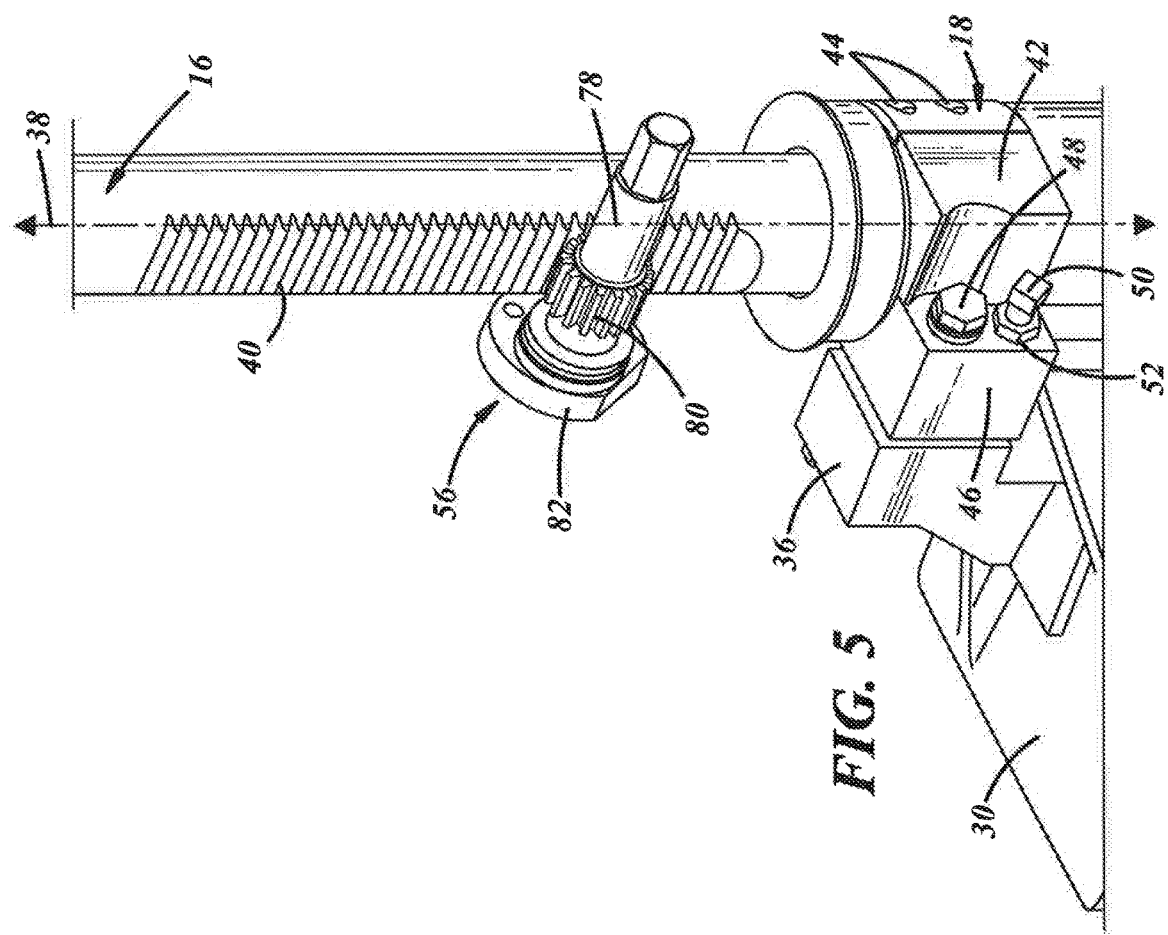
FIG. 5 is a perspective view of a portion of the actuator of FIGS. 1-4.

Guide post 16 is carried by base mount 14 and provides part of a means for adjusting the vertical position of gearboxes 20, 24 servo motor 22, arm 26 and, ultimately, burner head 12. Guide post 16 is substantially round in cross-section and extends through arm 34 of base mount 14, post clamp 18 and gearbox 20 along a longitudinally extending guide post axis 38. Guide post 16 may be supported within arm 34 of base mount 14 by needle roller bearings disposed at either axial end of arm 34. Referring to FIG. 5, a portion of guide post 16 defines a rack 40 comprising a plurality of gear teeth arranged along a flat formed in the radially outer surface of guide post 16. Upon assembly, rack 40 is configured to be disposed at least partially within gearbox 20.

Referring again to FIGS. 1-4, post clamp 18 inhibits movement of guide post 16 along axis 38. Post clamp 18 also controls movement of guide post 16 (and gearboxes 20, 24, servo motor 22, arm 26 and burner head 12) about axis 38. Post clamp 18 is disposed about guide post 16 axially between gearbox 20 and one end of arm 34 of base mount 14. Referring again to FIG. 5, post clamp 18 has a split collar portion 42 that is configured to receive guide post 16. Fasteners 44 extend across the circumferential ends of the split collar portion 42 to draw the circumferential ends towards one another and clamp portion 42 down upon guide post 16. Post clamp 18 further defines a mounting flange 46 extending from portion 42. Flange 46 is configured for alignment with, and coupling to, mounting bracket 36 on base mount 14. Flange 46 of post clamp 18 carries a locking bolt 48 that extends through flange 46 and into a threaded bore in mounting bracket 36. When bolt 48 is fastened to base mount 14 through bracket 36, rotation of guide post 16 about axis 38 is prevented and gearboxes 20, 24, servo motor 22, arm 26 and burner head 12 are locked in an operating position about axis 38 relative to the glassware forming machine. When bolt 48 is unfastened from mounting bracket 36 of base mount 14, guide post 16 is rotatable about axis 38, along with gearboxes 20, 24, servo motor 22, arm 26 and burner head 12, such that these components may be rotated from the operating position to a maintenance position. Because gearboxes 20, 24, servo motor 22, arm 26 and burner head 12 may be rotated away from the operating position to a maintenance position (e.g., over a ninety (90) degree arc), servicing of the components is much easier than in conventional burner head actuators in which access to the arm 26 and burner head 12 often requires reaching blindly into the glassware forming machine in order to access and remove the arm 26 and burner head 12. Flange 46 also carries a position adjustment screw 50 that extends through flange 46 and abuts a face of mounting bracket 36. Rotation of position adjustment screw 50 allows adjustment of the operating position of gearboxes 20, 24, servo motor 22, arm 26 and burner head 12 relative to the glassware forming machine within a plane perpendicular to axis 38. Once position adjustment is complete, a hex jam nut 52 may be used to lock screw 50 in place and prevent further rotation from vibration.

Figure 6:
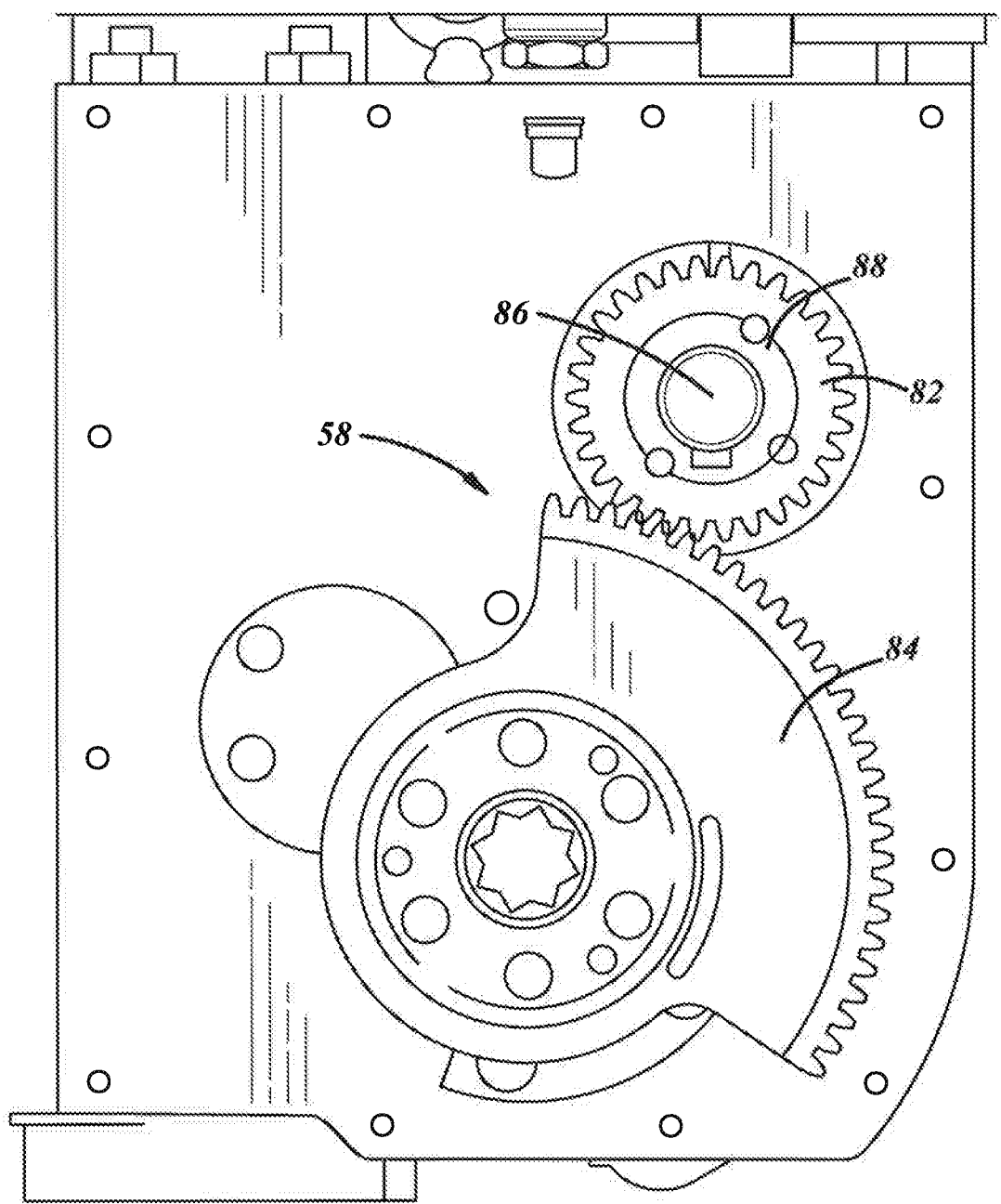
FIG. 6 is a plan view of a portion of the actuator of FIGS. 1-4.

Referring again to FIGS. 1 and 3, gearbox 20 is provided to transfer torque from servo motor 22 and gear box 24 to arm 26. Gearbox 20 includes a housing 54. Referring to FIGS. 5 and 6, respectively, gearbox 20 also includes a pinion gear assembly 56 and a gear train 58.

Figure 3:
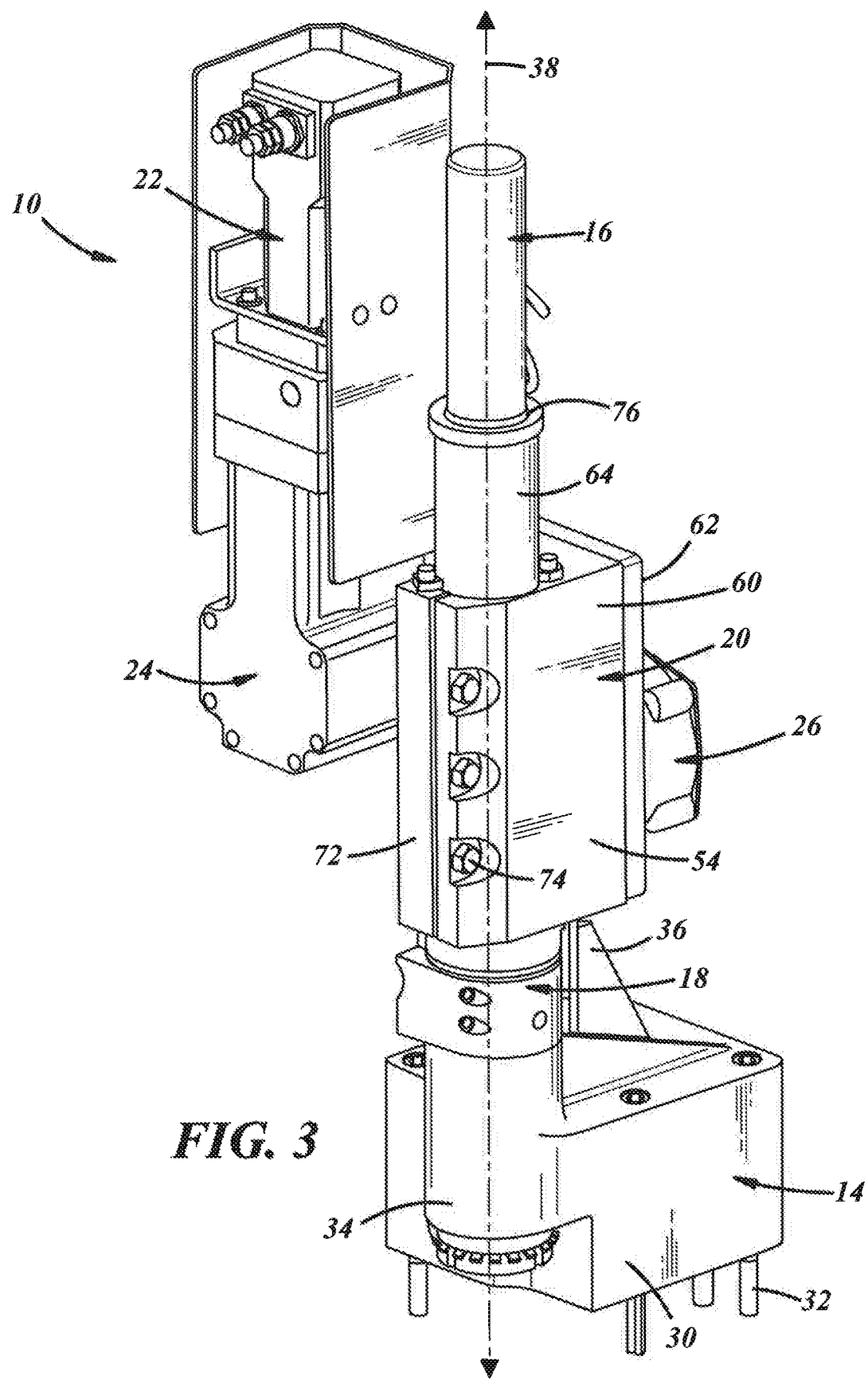
Figure 7:
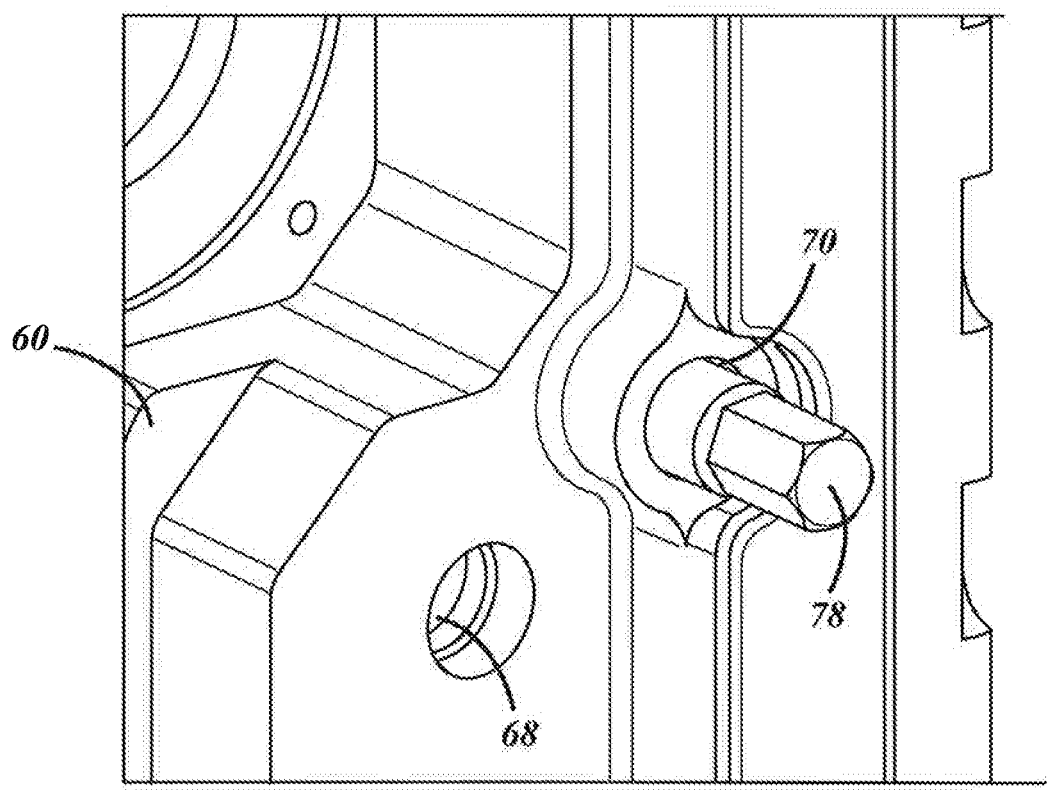
FIG. 7 is a perspective views of a portion of the actuator of FIGS. 1-4.

Referring again to FIGS. 1 and 3, housing 54 is provided to support and orient the other components of gearbox 20 and to protect those components from external elements and objects. Housing 54 is carried on guide post 16 and may include multiple members 60, 62, 64. Referring to FIG. 1, housing member 60 includes a box-like portion 66 having a bottom wall and two pairs of opposed side walls perpendicular to, and extending from, the bottom wall and configured to support pinion gear assembly 56 and gear train 58 therein. Housing member 62 provides a top wall opposing the bottom wall of portion 66 of housing member 60 and may be fastened to portion 66 using fasteners that extend through housing member 62 and into fastener bores in the side walls of portion 66 of member 60. In this manner, housing 54 provides relatively easy access to gear train 58 for servicing. Referring to FIG. 7, the bottom wall of housing member 60 defines bores 68, 70 extending therethrough and configured to receive portions of arm 26 and pinion gear assembly 56, respectively, as discussed in greater detail below. Referring to FIG. 3, housing member 60 also includes a split-collar portion 72 coupled to guide post 16 that can be loosened and tightened on guide post 16 to facilitate movement and fastening with respect to guide post 16. Fasteners 74 may be inserted through bores in one circumferential end of portion 72 and extend across the split into threaded bores in the opposite circumferential end of portion 72 to draw the circumferential ends towards one another and clamp portion 72 down upon guide post 16. Member 64 is fixed to member 60 and extends upward from split collar portion 72 of member 60. Member 64 is tubular and is configured to receive a portion of guide post 16. Member 64 may be made from conventional metals and metal alloys such as steel may support a shaft wiper or scraper seal 76 to remove foreign objects and elements from guide post 16 and prevent entry of those objects and elements into rack and pinion gear assembly 56 as gearbox 20 is moved up and down guide post 16. The use of member 64 and seal 76 represents an improvement over conventional actuators that employ a high temperature bellows having a relatively short lifespan.

Referring to FIG. 5, pinion gear assembly 56 provides another part of a means for adjusting the vertical position of gearboxes 20, 24 servo motor 22, arm 26 and, ultimately, burner head 12. Assembly 56 may include a shaft 78 and a pinion gear 80. Shaft 78 extends from, and is rotatably supported on, a plate assembly 82 (e.g., by a close (tight), but smooth turning, cylindrical tolerance fit between shaft 78 and plate assembly 82) that is affixed to housing member 60 of gearbox housing 54. Shaft 78 supports pinion gear 80. Referring to FIG. 7, shaft 78 extends outward from gearbox housing 54 through bore 70 in the bottom wall of housing member 60. One longitudinal end of shaft 78 may be configured with one or more flats (e.g., a hexagonal configuration) or another feature to allow engagement by a tool for rotation of shaft 78 and pinion gear 80. Referring again to FIG. 5, pinion gear 80 is rotatably carried by housing 54 (and particularly shaft 78) and engages rack 40 in guide post 16. Pinion gear 80 is rotatable through rotation of shaft 78 to move gearbox 20 (as well as servo motor 22, gearbox 24, arm 26 and burner head 12) up and down guide post 16. The use of a rack 40 and pinion gear 80 mechanism to vary the height of gearboxes 20, 24, servo motor 22, arm 26 and burner head 12 is advantageous as compared to structures used in conventional burner head actuators because the design is less complex and requires fewer customized parts.

Referring again to FIG. 6, gear train 58 is provided to transfer torque from servo motor 22 and gear box 24 to arm 26 in order to rotate arm 26 and burner head 12 between operating and non-operating positions. Gear train 58 is carried by gearbox housing 54 and includes a drive gear 82 and a driven gear 84. Drive gear 82 comprises a spur gear that is driven by an output of servo motor 22 and gearbox 24. Drive gear 82 is relatively large and includes thirty (30) teeth in the illustrated embodiment. Drive gear 82 may be coupled to an output 86 of gearbox 24 using a taper-lock bushing 88 which is advantageous relative to conventional actuators that employ more complex attachment systems between the gear train 58 and the output 86 of gearbox 24 and require custom modifications and sizing of the output 86 of gearbox 24. Driven gear 84 may comprise a spur gear and may further comprise a sector gear. In the illustrated embodiment, gear 84 includes twenty-eight (28) teeth spanning about one hundred and twenty-five (125) degrees and is configured to enable rotation of arm 26 over a span of eighty (80) degrees between operating and non-operating positions. The design of gear train 58 is advantageous relative to those used in conventional actuators in which an additional idler gear was required to attempt to remove backlash. Referring to FIG. 8, driven gear 84 is supported for rotation on a pivot shaft bushing 89 that extends through bore 68 in the bottom wall of portion 66 of member 60 of housing 54. Driven gear 84 is supported for rotation on pivot shaft bushing 89 by needle roller bearings and needle roller thrust bearings that are installed onto pivot shaft bushing 89. Driven gear 84 supports a drive mounting face 90 that is coupled to driven gear 84 using fasteners such as screws and dowel pins. Drive mounting face 90 defines a plurality of radially extending keyways that may be equally circumferentially spaced from one another and configured to receive corresponding keys on a corresponding drive face mount coupled to burner head arm 26 as discussed below in order to couple burner head arm 26 to driven gear 84 for rotation therewith.

Referring again to FIGS. 1-4, servo motor 22 and gearbox 24 are provided to generate, and transfer, respectively torque for use in driving gear train 58 in gearbox 20. Servo motor 22 includes a motor, an encoder that provides feedback regarding the position and/or speed of the output shaft of the motor and a controller that controls rotation of the output shaft responsive to the encoder. Servo motor 22 is coupled to gearbox 20. In the illustrated embodiment, servo motor 22 is indirectly coupled to drive gear 82 of gear train 58 in gearbox 20 through gearbox 24. It should be understood, however, that the output of servo motor 22 could be directly coupled to gear 82 in alternative embodiments. Gear box 24 is provided to transfer output torque from servo motor 22 to gear train 58 of gearbox 20. In the illustrated embodiment, gearbox 24 comprises a right angle gearbox that translates the torque from an output shaft of servo motor 22 rotating about an axis substantially parallel to guide post axis 16 to an output 86 of gearbox 24 rotating about an axis in a plane substantially perpendicular to axis 16. Gearbox 24 may be affixed to the bottom wall of portion 66 of housing member 60 of gearbox 20.

Figure 9:
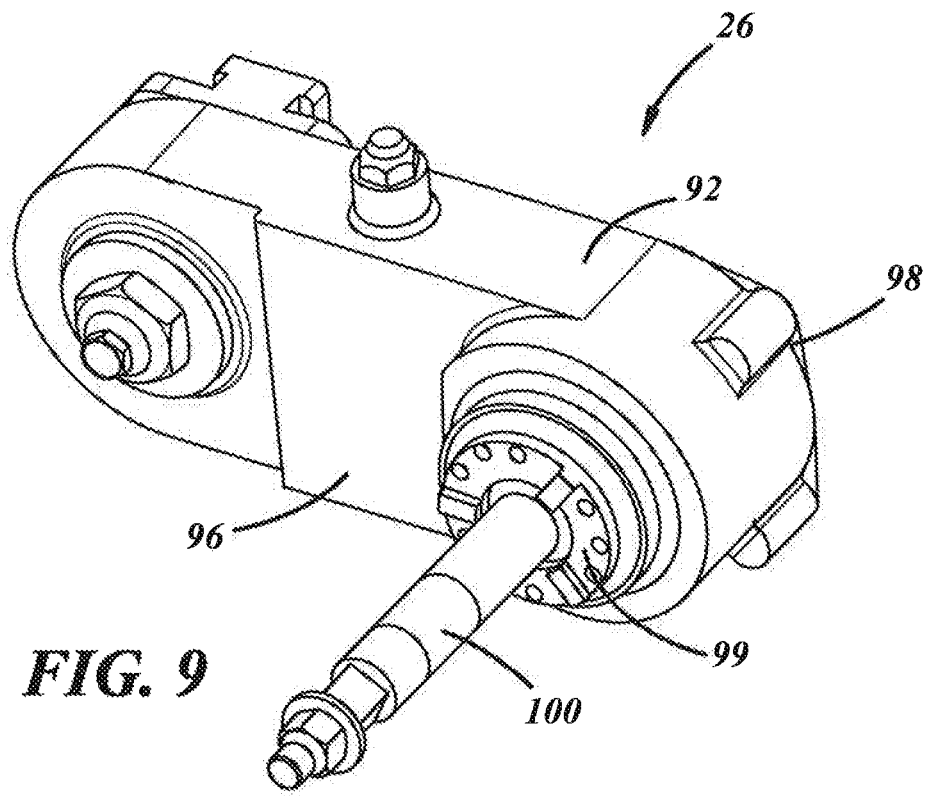
FIG. 9 is a perspective view of a burner head arm of the actuator of FIGS. 1-4.
Figure 10:
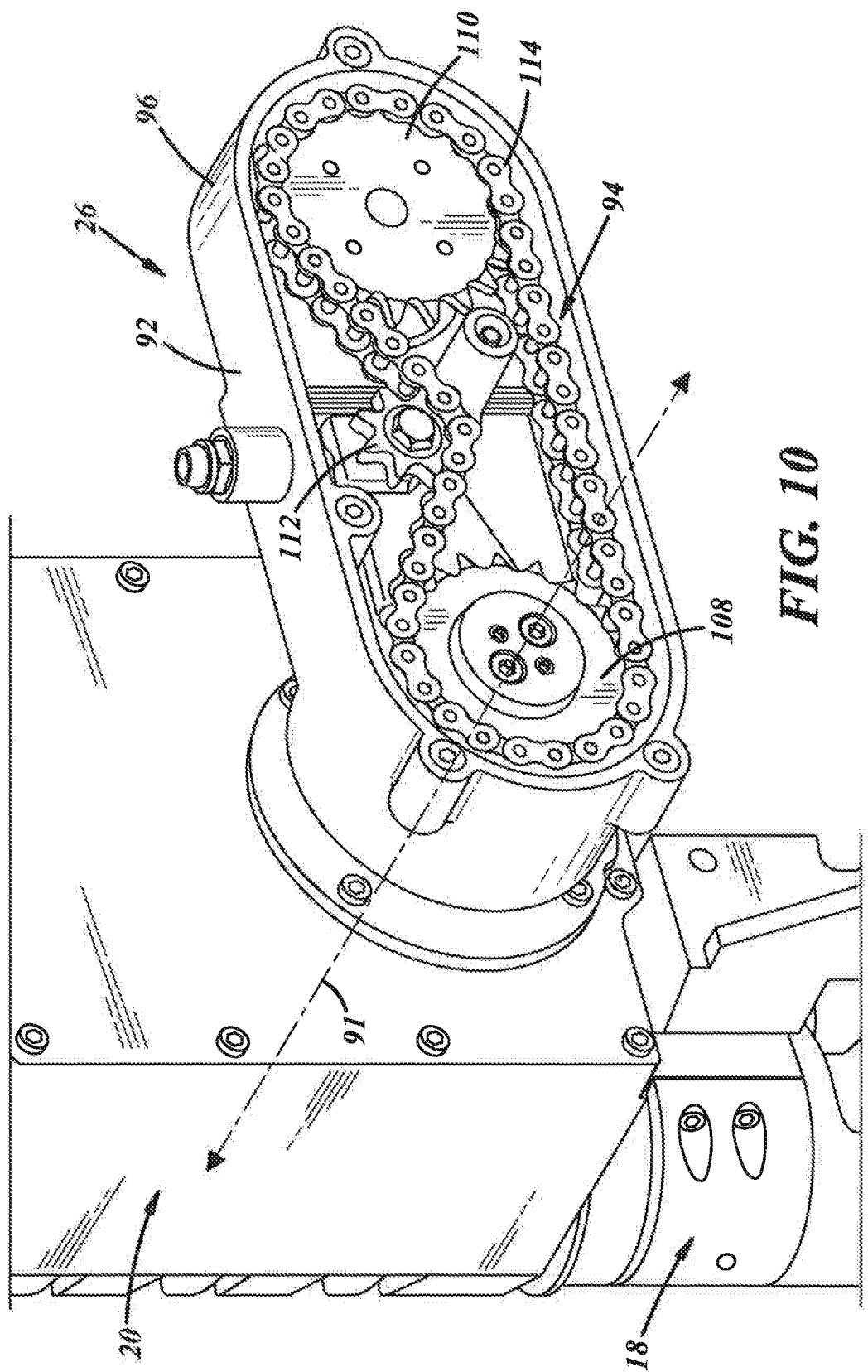
FIG. 10 is a perspective view of a portion of the actuator of FIGS. 1-4.
Figure 11:
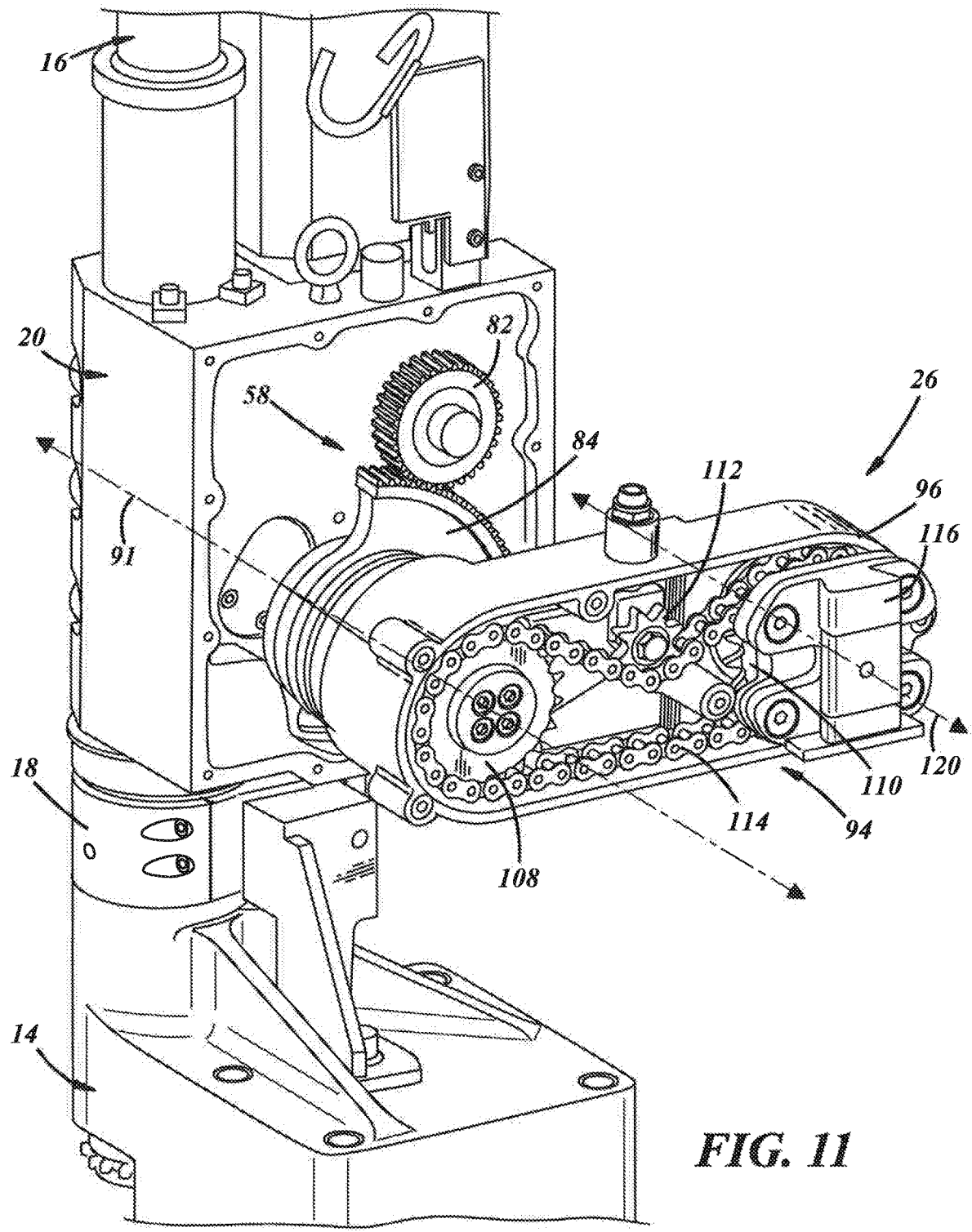
FIG. 11 is a perspective view of a portion of the actuator of FIGS. 1-4.

Referring to FIG. 1, burner head arm 26 is provided to move burner head 12 between a lubricating position and a non-lubricating position. Arm 26 is carried by gearbox 20 and is coupled to driven gear 84 in gear train 58 for rotation relative to housing 20 about an arm axis 91. Referring to FIGS. 1 and 9, arm 26 includes a housing 92. Referring to FIGS. 10-11, arm 26 further includes a burner head leveling gear train 94 disposed within housing 92. In accordance with certain aspects of the disclosed actuator 10, the construction of housing 92 and gear train 94 provides a relatively lightweight arm 26 for moving burning head 12 as compared to arms found in conventional actuators and the arm 26 is also easier to fabricate and to assemble and disassemble than arms found in conventional actuators.

Figure 4:
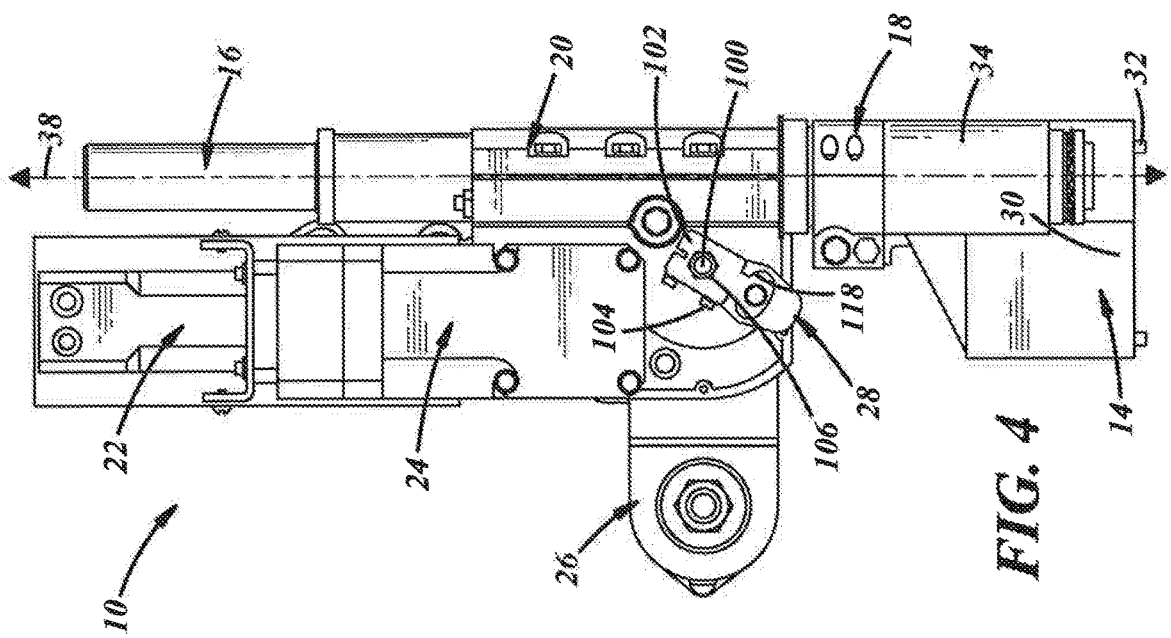
FIG. 4 is a plan view of the burner head actuator of FIGS. 1-3.

Housing 92 provides support for and orients the components of gear train 94 and protects the components of gear train 94 from foreign objects and elements. Referring again to FIGS. 1 and 9, housing 92 may include multiple members 96, 98. Member 96 defines a bottom wall configured to support elements of gear train 94 and an elliptical (or oval) side wall that extends from the bottom wall. Member 98 defines a top wall opposing the bottom wall of member 96 and may be fastened to member 96 using fasteners that extend through member 98 and into fastener bores in the side wall of member 96. In this manner, housing 92 provides relatively easy access to gear train 94 for servicing. Referring to FIG. 10, housing 92 is carried by gearbox 20 and is coupled to driven gear 84 in gearbox 20 for rotation relative to gearbox housing 54 about arm axis 91. In particular, and with reference to FIG. 9, housing 92 includes a drive face mount 99 coupled to member 96 of housing using fasteners such as screws and dowel pins and defining a plurality of radially extending, circumferentially spaced keys configured to engage the keyways in drive mounting face 90 coupled to driven gear 84. Torque generated in driven gear 84 is transferred to housing 92 through drive mounting face 90 and drive face mount 99 to cause rotation of housing 92. Housing 92 includes a rod 100 that extends from the bottom wall of member 96 of housing 92. Rod 100 extends through drive face mount 99. Referring to FIG. 8, rod 100 also extends through an aperture in member 62 of gearbox housing 54, drive mounting face 90, sector gear 84 and pivot shaft bushing 89. Finally, and with reference to FIG. 7, rod 100 extends through bore 68 in the bottom wall of portion 66 of member 60 of gearbox housing 54 such that a portion of rod 100 extends outside of gearbox housing 20 on a side of housing 54 opposite from arm housing 92. Referring to FIG. 4, an arm clamp 102 may be disposed about rod 100 on the side of gearbox housing 54 opposite arm housing 92 and the opposed portions of clamp 102 may be tightened down upon rod 100 using fasteners 104 that extending between the opposed portions of clamp 102 on diametrically opposite sides of rod 100. A nut 106 may further be disposed about a threaded portion of rod 100 to secure arm housing 92 against movement along arm axis 91. Because arm 26 is mounted within actuator 10 using only clamp 102 and nut 106, arm 26 (and burner head 12) may be easily detached and reattached to actuator 10 by removing nut 106 and fasteners 104 from clamp 102 to permit servicing of arm 26 and burner head 12.

Referring again to FIGS. 10-11, gear train 94 is provided to rotate burner head 12 as arm 26 is rotated between a lubricating and non-lubricating position in order to maintain a level of burner head 12 parallel to the ground. Gear train 94 includes a drive sprocket 108, a driven sprocket 110, an idler sprocket 112 and a chain 114. Drive sprocket 108 and driven sprocket 110 are located at opposite longitudinal ends of arm housing 92 and have the same number of teeth resulting in a 1:1 drive ratio. Drive sprocket 108 is coupled to, and direct-driven about arm axis 91 by, driven gear 84 of gear train 58 in gearbox 20. Drive sprocket 108 is coupled to rod 100 through one or more fasteners. Driven sprocket 110 is driven by drive sprocket 108 via chain 114. Idler sprocket 112 is disposed between drive sprocket 108 and driven sprocket 110 on an opposite side of chain 114 relative to sprockets 108, 110, and takes up tension in chain 114. Referring to FIG. 11, driven sprocket 110 supports a t-shaped nut 116 for rotation with driven sprocket 110. A fastener, such as a bolt, extending from burner head 12 may be threaded into nut 116 to secure burner head 12 to driven sprocket 110 for rotation with driven sprocket 110.

Referring again to FIG. 4, leveling arm 28 provides a means for locating burner head 12 at a desired level (typically parallel to ground) after assembly. In particular, arm 28 is configured to enable adjustment of a position of burner head arm 26 relative to gearbox housing 20 and thereby establish a level for burner head 12. Leveling arm 28 is disposed between arm clamp 102 and the bottom wall of portion 66 of member 60 of gearbox housing 54. Arm 28 is disposed about and engages rod 100 and is configured to rotate with rod 100. A threaded shank 118 extends from arm 28 parallel to arm axis 91 and through an elongate slot in arm clamp 102. A nut may be threaded onto the shank 118 and bear against the face of arm clamp 102 to maintain the position of leveling arm 28 relative to arm clamp 102. To adjust the level of burner head 12, the nut may be loosened and nut 106 is also loosened from the end of rod 100 on arm 26. Leveling arm 28 may then be shifted by hand relative to arm clamp 102 to cause rotation of rod 100 and arm 26 and, consequently, movement of burner head 12. The nuts are then retightened.

Referring again to FIG. 11, during normal operation of actuator 10, servo motor 22 is controlled to generate an output torque in accordance with a predetermined schedule and/or one or more sensed parameter values. Rotation of an output of servo motor 22 is transferred through gearbox 24 to drive gear 82 in gear train 58 of gearbox 20 and from drive gear 82 to driven gear 84. Rotation of driven gear 84 causes corresponding rotation of burner head arm 26 and of drive sprocket 108 of gear train 94 about arm axis 91. The rotation of drive sprocket 108 is transferred to driven sprocket 110 by chain 114 and from driven sprocket 110 to burner head 12. As burner head arm 26 rotates about arm axis 91, burner head 12 rotates about a parallel burner head axis 120 with driven sprocket 110 such that burner head 12 remains level or parallel to ground through the complete cycle of motion between the lubricating and non-lubricating positions.

A burner head actuator 10 in accordance the present teachings represents an improvement as compared to conventional actuators. The actuator 10 maintains the burner head 12 in a level position as it moves towards and away from the lubricating position. The disclosed actuator 10 also enables movement of the burner head 12 in various directions using mechanisms that are relatively simple, lightweight and easy to manufacture and assemble/disassemble. Further, the disclosed actuator 10 enables easy access to the burner head 12 and supporting components in order to service the burner head 12 and supporting components.

While the burner head actuator has been shown and described with reference to one or more particular embodiments thereof, it will be understood by those of skill in the art that various changes and modifications can be made without departing from the spirit and scope of the invention.

What is claimed is:

1. A burner head actuator for lubricating glassware molds of a glassware forming machine, comprising:
   a base mount;
   a guide post carried by the base mount and having a longitudinally extending guide post axis;
   a gearbox having a housing carried on the guide post and a gear train carried by the housing and including a drive gear and a driven gear;
   a servomotor coupled to the gearbox; and
   a burner head arm carried by the gearbox housing and coupled to the driven gear for rotation relative to the gearbox housing about an arm axis, the arm including a burner head leveling gear train including a drive sprocket direct-driven by the driven gear about the arm axis and a driven sprocket driven by the drive sprocket via a chain;
   wherein the servomotor actuates the gearbox to rotate the gearbox drive gear, thereby rotating the gearbox driven gear and the burner head arm, and thereby rotating the leveling gear train so that the burner head remains level as the arm is rotated about the arm axis.

2. The burner head actuator of claim 1, further comprising a post clamp disposed about the guide post and carrying a locking bolt wherein the locking bolt is fastenable to the base mount to prevent rotation of the guide post about the guide post axis and lock the gearbox, arm and burner head in an operating position about the guide post axis relative to the glassware forming machine, and is unfastenable to allow rotation of the guide post about the guide post axis and to allow the gearbox, the arm and the burner head to be rotated about the guide post axis to a maintenance position.

3. The burner head actuator of claim 2, further comprising a position adjustment screw extending through the post clamp and movable to adjust the operating position of the gearbox, arm and burner head relative to the glassware forming machine.

4. The burner head actuator of claim 1, further comprising a leveling device configured to enable adjustment of a position of the burner head arm relative to the housing of the gearbox.

5. The burner head actuator of claim 1, wherein the burner head arm includes a housing for the gear train and a rod that extends from the burner head arm housing and through the gearbox housing and has a threaded end that extends outside of the gearbox housing on a side of the gearbox housing opposite from the burner head arm housing and further comprising an arm clamp disposed about the rod on the side of the gearbox housing opposite the burner head arm housing and a nut disposed about the threaded portion of the rod.

6. The burner head actuator of claim 5, further comprising a leveling arm disposed about the rod and a fastener extending from the leveling arm through a slot on the arm clamp such that a relative position of the clamp and leveling arm may vary to adjust a position of the burning head arm relative to the gearbox housing.

7. The burner head actuator of claim 1 wherein the gearbox housing has a split-collar portion coupled to the guide post that can be loosened and tightened on the guide post to facilitate movement and fastening with respect to the guide post.

8. The burner head actuator of claim 1 wherein the gearbox housing includes a wiper seal disposed between the gearbox housing and the guide post.

9. The burner head actuator of claim 1 wherein the driven gear of the gear box comprises a sector gear.

10. A burner head actuator for lubricating glassware molds of a glassware forming machine, comprising:
    a base mount;
    a guide post carried by the base mount and having a gear rack and a longitudinally extending guide post axis;
    a gearbox having a housing vertically adjustably carried on the guide post via a pinion gear rotatably carried by the housing and rotatable to move the gearbox housing up and down the guide post and a gear train carried by the housing and including a drive gear and a driven gear;
    a servomotor coupled to the gearbox; and
    a burner head arm carried by the gearbox housing and coupled to the driven gear for rotation relative to the gearbox housing about an arm axis, the arm including a burner head leveling gear train including a drive sprocket direct-driven by the driven gear about the arm axis and a driven sprocket driven by the drive sprocket via a chain;
    wherein the servomotor actuates the gearbox to rotate the gearbox drive gear, thereby rotating the gearbox driven gear and the burner head arm, and thereby rotating the leveling gear train so that the burner head remains level as the arm is rotated about the arm axis.

11. The burner head actuator of claim 10, further comprising a leveling device configured to enable adjustment of a position of the burner head arm relative to the housing of the gearbox.

12. The burner head actuator of claim 10, wherein the burner head arm includes a housing for the gear train and a rod that extends from the burner head arm housing and through the gearbox housing and has a threaded end that extends outside of the gearbox housing on a side of the gearbox housing opposite from the burner head arm housing and further comprising an arm clamp disposed about the rod on the side of the gearbox housing opposite the burner head arm housing and a nut disposed about the threaded portion of the rod.

13. The burner head actuator of claim 12, further comprising a leveling arm disposed about the rod and a fastener extending from the leveling arm through a slot on the arm clamp such that a relative position of the clamp and leveling arm may vary to adjust a position of the burner head arm relative to the gearbox housing.

14. The burner head actuator of claim 10 wherein the gearbox housing has a split-collar portion coupled to the guide post that can be loosened and tightened on the guide post to facilitate movement and fastening with respect to the guide post.

15. The burner head actuator of claim 10 wherein the gearbox housing includes a wiper seal disposed between the gearbox housing and the guide post.

16. The burner head actuator of claim 10 wherein the driven gear of the gear box comprises a sector gear.

17. A burner head actuator for lubricating glassware molds of a glassware forming machine, comprising:
    a base mount;
    a guide post carried by the base mount and having a gear rack and a longitudinally extending guide post axis;
    a gearbox having a housing vertically adjustably carried on the guide post via a pinion gear rotatably carried by the housing and rotatable to move the gearbox housing up and down the guide post and a gear train carried by the housing and including a drive gear and a driven gear;

a servomotor coupled to the gearbox;

a burner head arm carried by the gearbox housing and coupled to the driven gear for rotation relative to the gearbox housing about an arm axis, the arm including a burner head leveling gear train including a drive sprocket direct-driven by the driven gear about the arm axis and a driven sprocket driven by the drive sprocket via a chain; and a post clamp disposed about the guide post and carrying a locking bolt wherein the locking bolt is fastenable to the base mount to prevent rotation of the guide post about the guide post axis and lock the gearbox, arm and burner head in an operating position about the guide post axis relative to the glassware forming machine, and is unfastenable to allow rotation of the guide post about the guide post axis and to allow the gearbox, the arm and the burner head to be rotated about the guide post axis to a maintenance position, wherein the servomotor actuates the gearbox to rotate the gearbox drive gear, thereby rotating the gearbox driven gear and the burner head arm, and thereby rotating the leveling gear train so that the burner head remains level as the arm is rotated about the arm axis.

18. The burner head actuator of claim 17, further comprising a position adjustment screw extending through the post clamp and movable to adjust the operating position of the gearbox, arm and burner head relative to the glassware forming machine.

19. The burner head actuator of claim 17, further comprising a leveling device configured to enable adjustment of a position of the burner head arm relative to the housing of the gearbox.

20. The burner head actuator of claim 17, wherein the gearbox housing has a split-collar portion coupled to the guide post that can be loosened and tightened on the guide post to facilitate movement and fastening with respect to the guide post.

\* \* \* \* \*